United States Patent [19]

Moritz

[11] Patent Number: 4,887,382
[45] Date of Patent: Dec. 19, 1989

[54] CRAB TRAP

[76] Inventor: Andrew J. Moritz, 3200 W. Commadore Way, Seattle, Wash. 98199

[21] Appl. No.: 261,111
[22] Filed: Oct. 24, 1988
[51] Int. Cl.⁴ .............................................. A01K 69/08
[52] U.S. Cl. .................................................... 43/102
[58] Field of Search ...................... 43/61, 66, 102, 103, 43/104, 100, 101, 105

[56] References Cited

U.S. PATENT DOCUMENTS

| | | | |
|---|---|---|---|
| 2,530,449 | 11/1950 | Bush | 43/102 |
| 3,184,881 | 5/1965 | Jatzeck | 43/102 |
| 3,209,484 | 10/1965 | Beamer | 43/100 |
| 3,300,890 | 1/1967 | Thomassen | 43/100 |
| 3,373,523 | 3/1968 | Olafson | 43/100 |
| 3,678,612 | 7/1972 | Hendrickson | 43/66 |
| 3,821,861 | 7/1974 | Jalbert | 43/65 |
| 4,075,779 | 2/1978 | Olafson | 43/100 |
| 4,184,283 | 1/1980 | Wyman | 43/102 |
| 4,538,376 | 9/1985 | Morton | 43/100 |
| 4,706,409 | 11/1987 | Downing | 43/102 |

FOREIGN PATENT DOCUMENTS 2017477 10/1979 United Kingdom .................... 43/66

Primary Examiner—Nicholas P. Godici
Assistant Examiner—James R. Miner
Attorney, Agent, or Firm—Glenn D. Bellamy

[57] ABSTRACT

A crab trap (10) is provided having a frame including a multi-sided bottom frame portion (12), a larger, equal-sided top frame portion (14) spaced thereabove, and generally diagonal frame members (16) connecting the top and bottom frame portions. A door opening (36) is provided adjacent at least one side of the bottom frame portion (12). Barrier walls are secured to the frame to define an enclosure which is normally closed. The barrier walls include a bottom barrier wall (24) and an inwardly opening flap door (38) which normally closes the door opening (36). The flap door has a top (40) which is connected to the trap (10) and a lower edge (42) which is normally continuous with the bottom barrier (24). The flap door (38) is resiliently bendable inwardly so that a crap (44) seeking to enter the trap (10) can lift the flap door (38) and crawl into the trap (10) below the flap door (38) and onto the bottom barrier wall (24). The overall shape of the trap (10) creates drag froces on the trap as it settles in the water which cause it to "parachute" or settle in an upright position to the bottom (50).

29 Claims, 4 Drawing Sheets

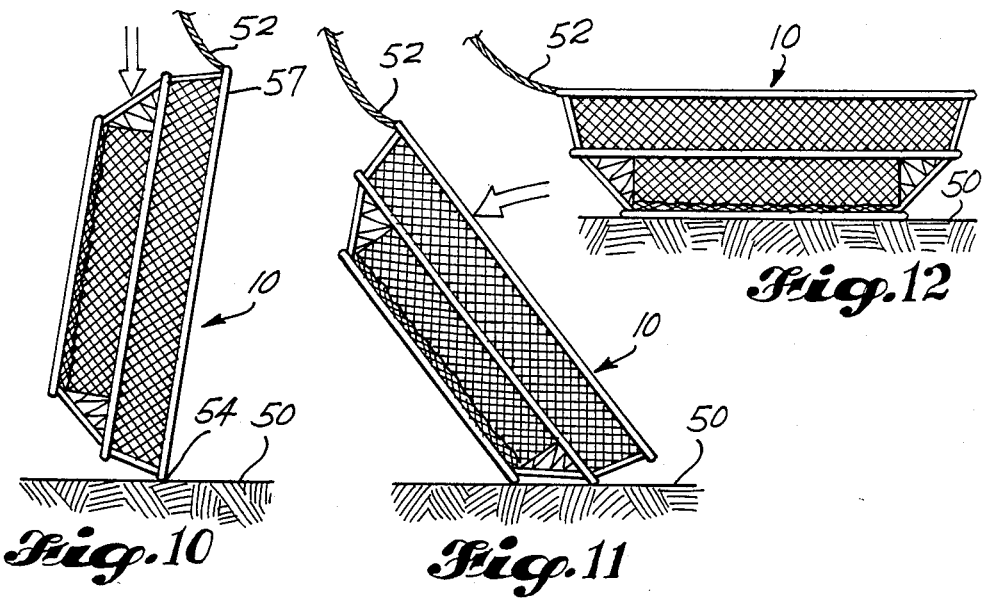
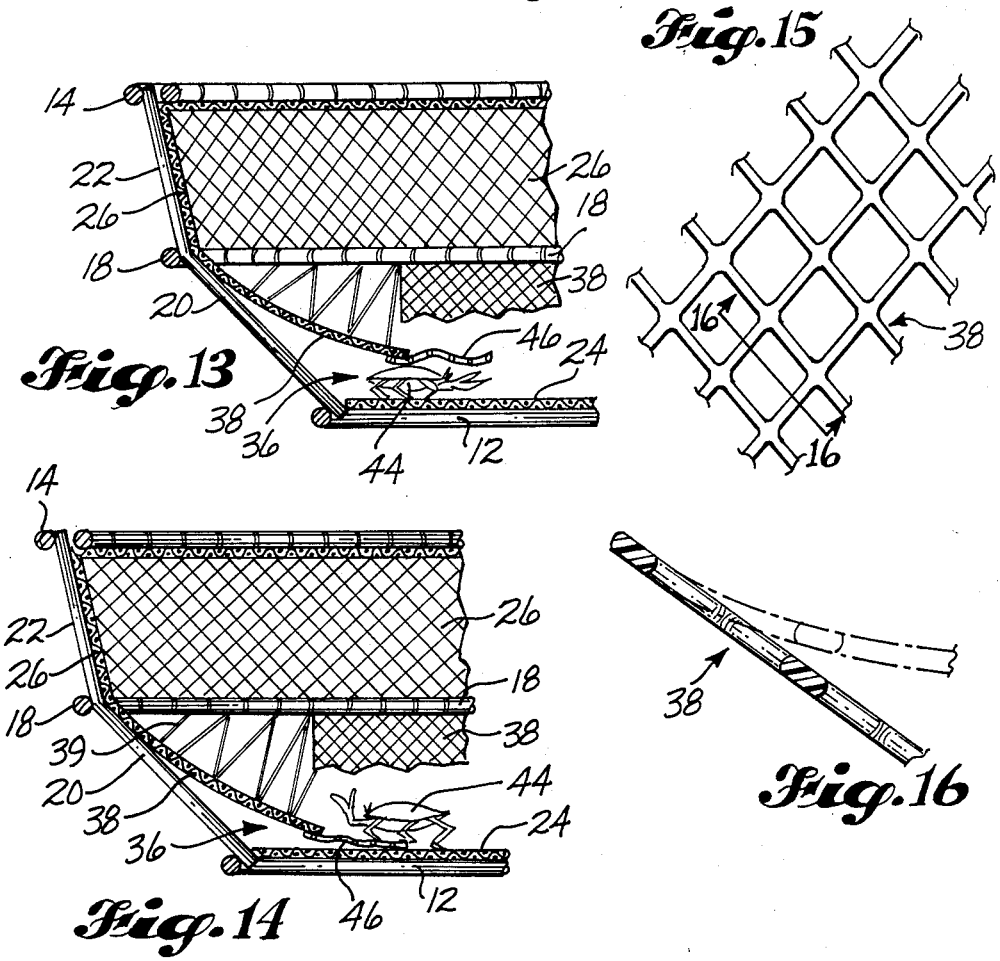

CRAB TRAP

TECHNICAL FIELD

This invention pertains to crab traps and more particularly to a type of trap having an improved antiescape entry gate and an overall shape which facilitates setting and retrieving the trap.

BACKGROUND OF THE INVENTION

Typical crab traps consist of a generally cubical or rectangular enclosure made of wire mesh or of netting supported by a metal frame. These traps generally have one or more entryways which provide a way for crabs to enter the trap and which prevent their escape therefrom. Typical traps of this nature are well known and shown in U.S. Pat. Nos. 3,184,881; 3,373,523; and 4,184,283.

The crab entryways are often in the form of an inwardly-converging and upwardly-sloped tunnel through which crabs will crawl seeking bait located inside the trap. Typically, escape from the trap is prevented, or at least deterred, by either spacing the interior end of the entry tunnel some distance above the bottom of the trap so that entering crabs spill over into the trap in a known manner, or by providing a swinging gate at the opening which acts as a one-way door, or by a combination of both.

Examples of such swinging gates are shown by U.S. Pat. Nos. 2,530,449 and 3,678,612. The disadvantages of such swinging gates are well known and are prone to malfunction due to corrosion and other factors. The problems associated with hinged entry gates are thoroughly discussed in U.S. Pat. No. 4,184,283 which discloses an upwardly sloped, converging entry tunnel having a comb-like gate structure made of a plurality of resiliently bendable tines affixed adjacent the inner end of the entry tunnel. An upwardly-spaced entry opening, without a one-way gate, is often inadequate to retain trapped crabs because of the crab's natural tendency to climb upwardly.

The structure of virtually all crab traps requires that the trap be set on the ocean floor in an upright position. Crab traps that are cubically or rectangularly shaped are generally simply placed in the water in an upright position and allowed to sink to the bottom. U.S. Pat. No. 2,530,449, issued to E. L. Bush, discloses a crab trap having concrete weights along bottom edges thereof and an upwardly-extending bridle to which a retrieval line is attached. A completely filled crab trap can be very difficult to lift or pull through the water. Weights built into the trap add to the difficulty of lifting the trap through the water and in the handling of the trap on deck.

DISCLOSURE OF THE INVENTION

The present invention provides a crab trap having a frame with a multi-sided bottom frame portion and a larger, equal-sided top frame portion spaced above the bottom frame portion. The top and bottom frame portions are connected by generally diagonal frame members. The frame defines a door opening adjacent at least one side of the bottom frame portion. Barrier walls are secured to the frame for defining an enclosure which is normally closed. There is a bottom barrier wall and an inwardly-opening flap door which normally closes the door opening. The flap door has a top which is connected to the trap and has a lower edge which, when the flap door is in its normally closed position, is contiguous to the bottom barrier wall. The flap door is resiliently bendable inwardly so that a crab seeking to enter the trap can lift the flap door and crawl into the trap below the flap door.

A preferred embodiment of the invention may be composed of substantially square bottom and top frame members and include an entry gate on each of the four sides of the square frame. The barrier walls and flap door may be formed of a resiliently bendable thermoplastic mesh material.

In preferred form, the flap door also includes a flexible portion along its lower edge so as not to present an obstacle which deters entry of crabs into the trap, and which provides a complete closure of the door opening to prevent crabs from exiting the trap through the door opening.

According to another aspect of the invention, the overall shape of the crab trap, having sides which slope inwardly as they extend from the top down to the bottom, produces drag forces acting on the trap, as the trap is moved through the water, that will cause the trap to remain substantially upright during settling or raising of the trap. The trap may include a bridle connected to one side of the top of the trap and extending to a leading portion which is outwardly spaced therefrom. A retrieving line may be connected to the leading portion of the bridle.

According to still another aspect of the invention, a method of setting a crab trap is provided which includes the provision of a crab trap having a multi-sided bottom, a larger, equal-sided top, sides which slope inwardly from the top to the bottom, and at least one entrance opening in a side of the trap adjacent the bottom. The trap is provided with a bridle connected to an upper region of the trap, at one side, and extending forwardly from the trap to a leading portion. A towing line is connected to the leading portion of the bridle and is held while the trap is placed in the water, bottom end down. The person setting the trap moves relatively forward in the water away from the trap while paying out on the towing line at a rate allowing the trap to settle in the water. The sides of the trap are provided with a slope that will produce drag forces causing the trap to maintain a substantially upright position while settling in the water.

Other features, aspects and advantages of the invention will be apparent from the drawings and following description of the best mode of the invention.

BRIEF DESCRIPTION OF THE DRAWINGS

Like reference numerals indicate like parts throughout the various figures of the drawing; and therein

FIGS. 10, 11 and 12 are sequential side views of the trap showing the self-righting characteristic of the trap;

FIG. 13 is a fragmentary cross-sectional view of the trap showing a crab entering the trap;

FIG. 14 is a fragmentary cross-sectional view showing a trapped crab;

FIG. 15 is a fragmentary plan view of a portion of the trap's barrier wall composed of a molded thermoplastic mesh material; and FIG. 16 is a fragmentary cross-sectional view taken substantially along line 16——16 of FIG. 15 showing the resilient flexibility of the molded thermoplastic barrier wall material.

BEST MODE FOR CARRYING OUT THE INVENTION

Figure 1:
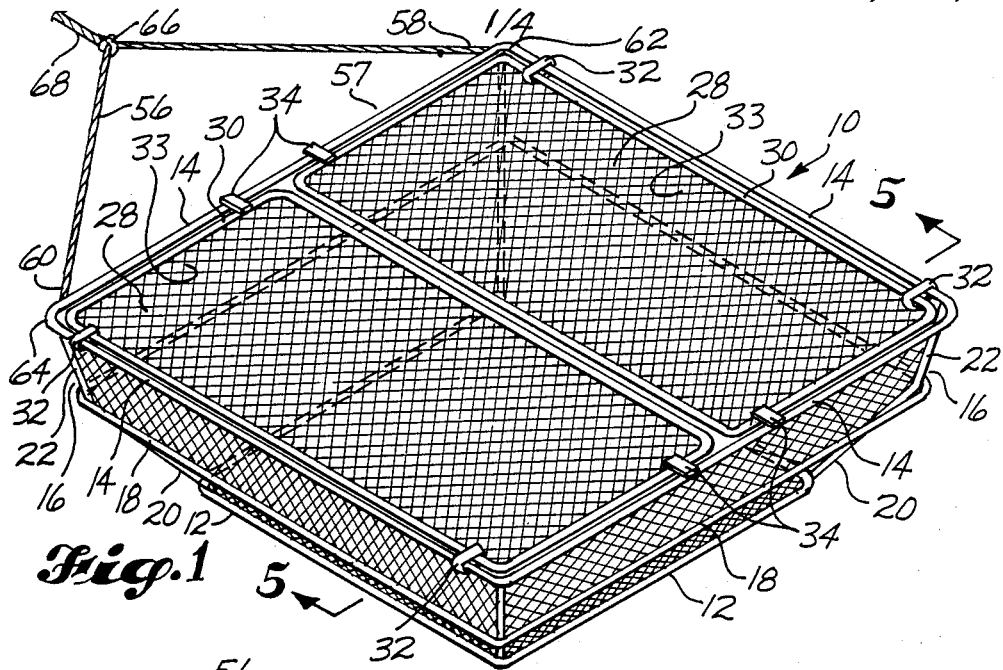
FIG. 1 is an upper isometric view of a crab trap constructed in accordance with the preferred embodiment of the invention, showing a towing bridle attached thereto.
Figure 2:
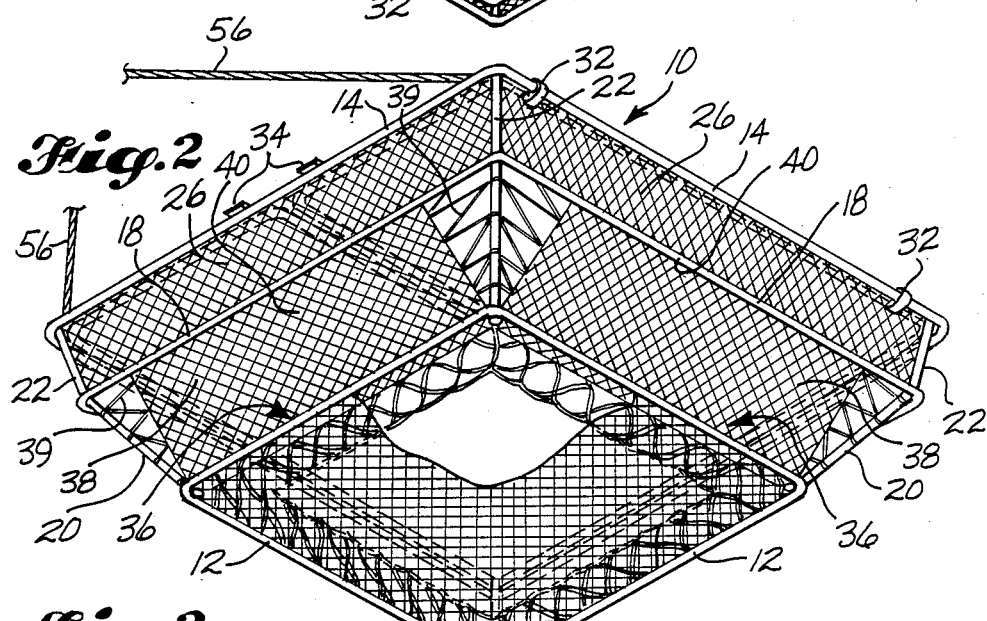
FIG. 2 is a lower isometric view of a crab trap like that shown in FIG. 1, with the bottom wall partially cut away for clarity.

Referring to the several figures of the drawing, and first to FIGS. 1 and 2, therein is shown at 10 a crab trap constructed according to the preferred embodiment of the present invention.

Figure 3:
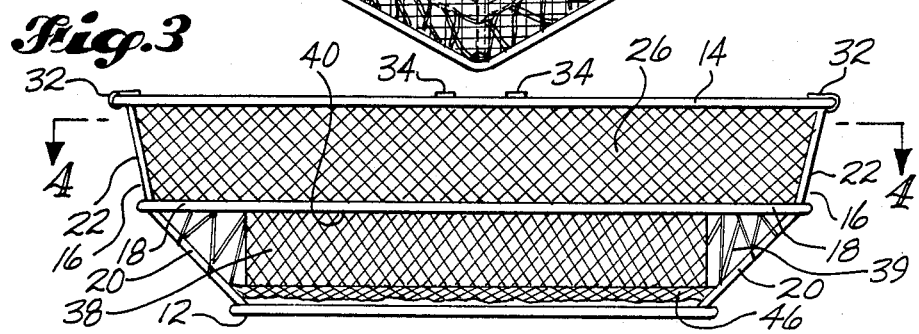
FIG. 3 is a side elevational view of the trap of FIG. 1.
Figure 4:
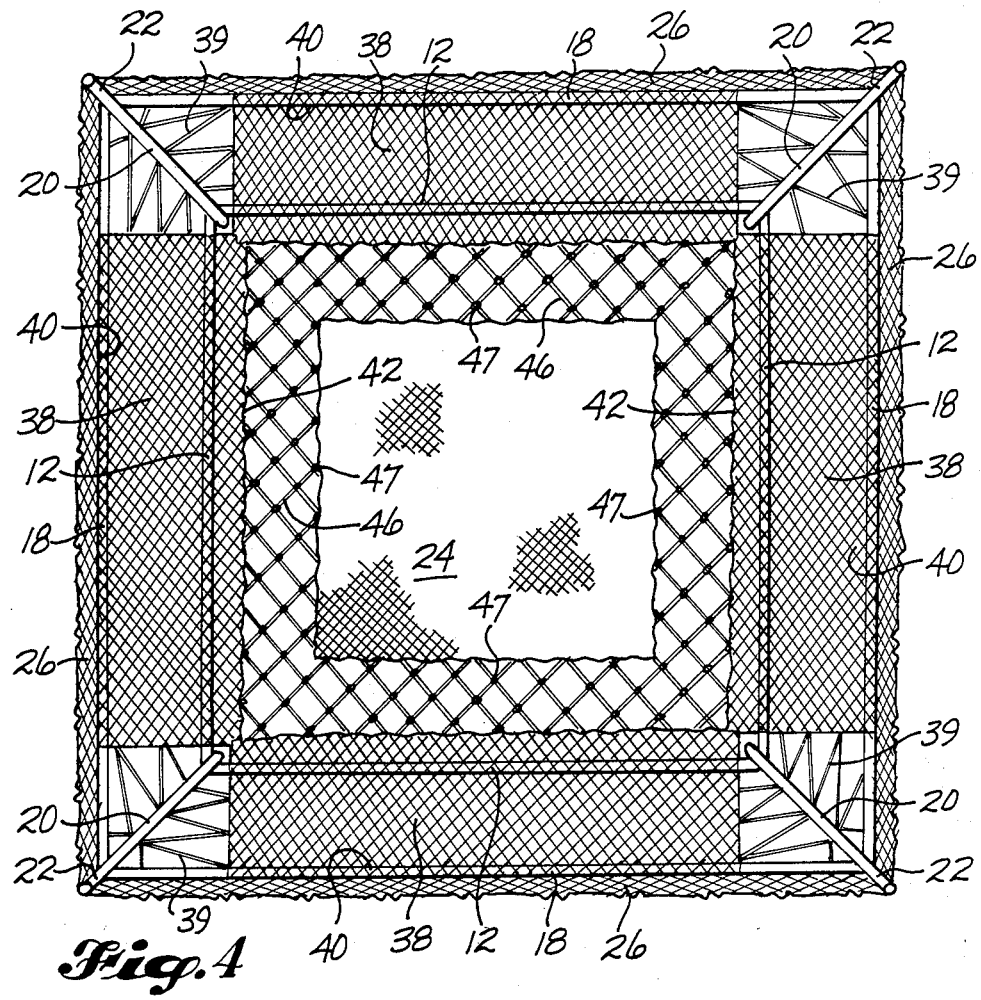
FIG. 4 is sectional view taken substantially along line 4—4 of FIG. 3.

The illustrated, preferred embodiment includes a substantially square bottom frame portion 12 and a larger, substantially square top frame portion 14. The top and bottom frame portions 14, 12 are connected by generally diagonal frame members 16. The illustrated embodiment also includes a substantially square intermediate frame portion 18. The intermediate frame portion 18 is also connected to the diagonal frame members 16. As shown in FIG. 3, in preferred form, the intermediate frame portion 18 is sized larger than the bottom frame portion 12 and smaller than the top frame portion 14. The diagonal frame members are attached to respective corners of the frame portions 12, 14, 18 and may be shaped to provide a greater degree of slope in a lower portion 20 than in an upper portion 22.

Barrier walls are secured to the frame 12, 14, 16, 18 to define a crab-trapping enclosure which is normally closed. The barrier walls include a bottom barrier wall 24, which is attached to the bottom frame portion 12, and side barrier walls 26 which are attached to the top and intermediate frame portions 14, 18 and the diagonal frame members 16.

Figure 5:
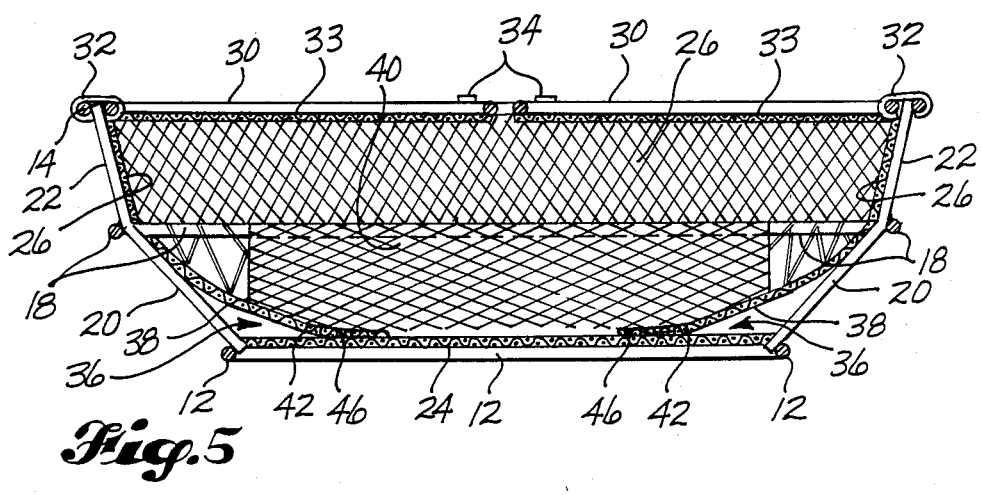
FIG. 5 is a sectional view taken substantially along line 5—5 of FIG. 1.
Figure 6:
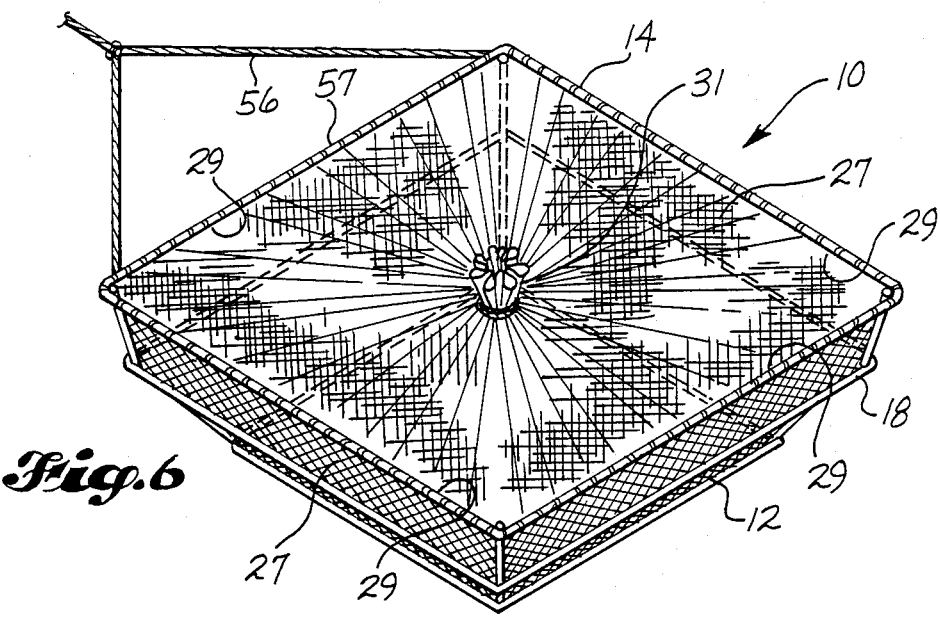
FIG. 6 is an upper isometric view of a crab trap constructed according to the present invention and showing an alternative top access means.

Typically, an access means for removing trapped crabs is located in the top side of the crab trap 10. As illustrated in FIG. 6, this may be in the form of a flexible net material 27 attached at outer edges 29 to the top frame portion 14 and gathered or "pursed" by a drawstring 31 in a well-known manner to provide a barrier to trapped crabs and also to provide an access opening for removal of trapped crabs. The preferred embodiment shown in FIGS. 1–3 and 5, includes a pair of hinged doors 28 in the top of the crab trap 10. The access doors 28 may be rectangularly shaped, each closing half of the top of the trap 10 as defined by top frame portion 14. Each door 28 includes an outer frame 30 attached by suitable hinges 32 to the top frame portion 14 along one side thereof. Attached to each frame 30 is a mesh material 33 which forms a barrier wall within the frame 30. The access doors 28 may be supported at outward points by stop members 34 and fastened closed in any acceptable well-known manner.

Referring now also to FIGS. 3–5, 13 and 14, door openings 36, through which crabs 44 may enter the trap 10, are defined adjacent at least one side of the bottom frame portion 12. In preferred form, there is a door opening 36 on each side of the trap 10. An inwardly-opening flap door 38 normally closes the door opening 36. The flap door 38 is connected at a top portion 40 to the intermediate frame portion 18. If the flap door 38 is made to be of a width only substantially equal to one side of bottom frame portion 12, the flap 38 may be laced 39 to adjacent diagonal frame members 16, thereby providing support to the flap door 38 and completing the barrier enclosure of the trap 10.

In preferred form, the flap door 38 is made of a molded thermoplastic mesh material which is resiliently bendable. As shown in FIG. 15, the mesh may be a non-woven, molded material of uniform composition. Alternatively, the mesh may be made of a woven core material imbedded in a relatively stiff thermoplastic material. In any event, the mesh which forms the flap door may be bent, or deflected, as shown in FIG. 16, and then returned to its original configuration as a result of a stored spring energy. Referring to FIGS. 5, 13 and 14, a lower edge 42 normally lies in a position contiguous with the bottom barrier wall 24, inwardly of the bottom frame portion 12. The flap door 38 is resiliently bendable inwardly to allow a crab to crawl into the trap 10 under the flap door 38 onto the bottom barrier wall 24 without substantial resistance. After a crab 44 has entered the trap 10, the flap door 38 will resume its original position of having its lower edge 42 contiguous to or in near proximity to the bottom barrier wall 24.

If desired, a strip of flexible, open-weave netting 46 may be attached to the lower edge 42 of the flap door 38 to extend inwardly and generally contiguous with the bottom barrier wall 24. The use of this strip of netting 46 allows the bottom edge 42 of the flap door 38 to be normally spaced a small distance above bottom barrier wall 24, thereby reducing resistance on a crab 44 entering the trap 10, while barring escape of trapped crabs 44 through the door opening 36. Because the netting 46 is flexible, or limp, it will normally lie against the bottom barrier wall 24. Without the benefit of being lifted by the lower edge 42 of the flap door 38, such as when a crab 44 enters the door opening 36, a crab 44 is unable to lift the netting 46 to gain escape from the trap 10. Because the netting 46 is of a relatively open weave, a crab 44 attempting to exit the trap will step through the netting 46 and proceed to climb upwardly along the inside of the flap door 38 and side barrier walls 26. If desired, the netting 46 may be secured to the bottom barrier wall 24 at central points 47. This helps to maintain the relatively flexible or limp netting 46 in its most effective, inwardly extending position, while permitting relatively unobstructed crab entrance.

Figure 7:
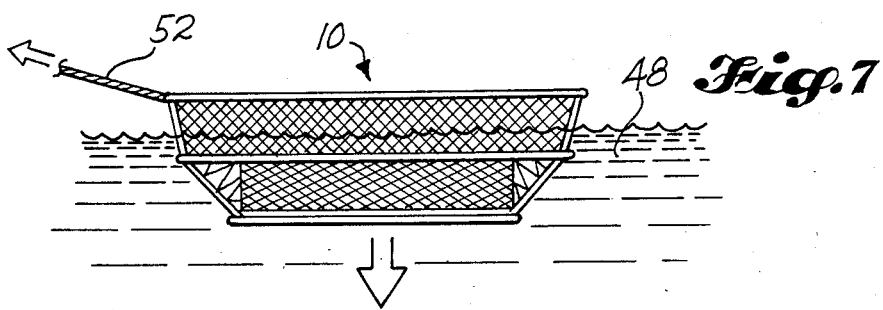
FIGS. 7, 8 and 9 are sequential side views of the trap as it is being placed in the water and allowed to settle to the bottom.
Figure 8:
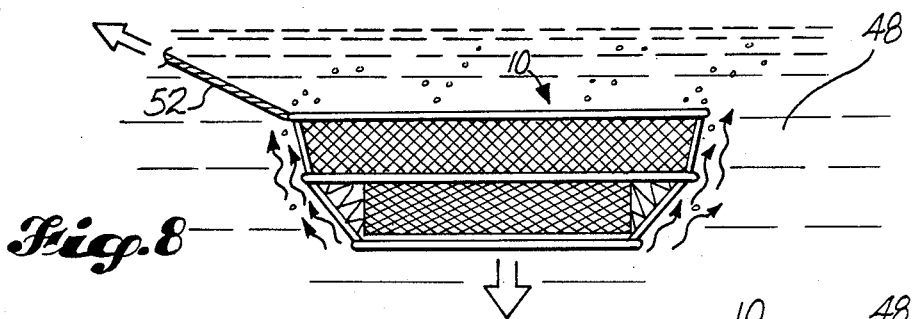
Figure 9:
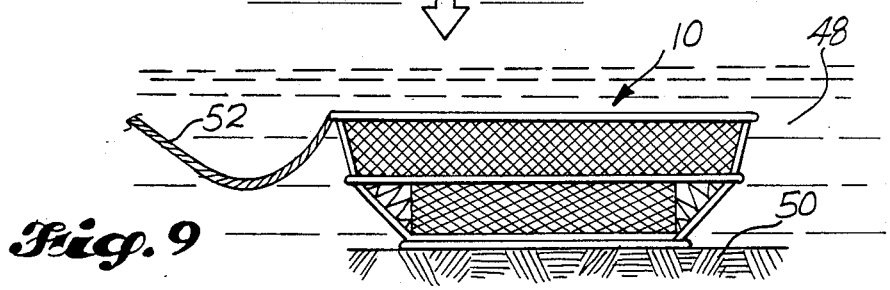

According to another aspect of the invention, the overall shape of the crab trap 10 is designed to produce drag forces acting on the trap as it settles through the water such that the trap will remain substantially upright during setting of the trap 10. Although the trap 10 is constructed primarily of a mesh material attached to frame members 12, 14, 16, 18, a significant amount of drag is produced by the trap 10 moving through water. The relative graduated size of top frame portion 14, intermediate frame portion 18, and bottom frame portion 12 cause the trap 10 to take on the general shape of an inverted frustum of a pyramid. In preferred form, the upper sidewall portions 26 are less inclined toward horizontal than the flap doors 38 which provide the lower sidewall barrier portions of the trap enclosure 10. As shown in FIGS. 7, 8 and 9, the trap 10 may be placed bottom end down in the water 48 and allowed to settle or "parachute" to the bottom 50. A retention line 52 is paid out at a rate which keeps the line 52 taut, but normally allows the trap 10 to settle without restraint. As illustrated in FIG. 8, as the trap 10 settles or "parachutes" through the water 48, drag forces created by the water 48 against the trap 10 cause the trap 10 to settle in a substantially upright position.

As illustrated in FIGS. 10, 11 and 12, if the normal settling of the trap 10 is disturbed by currents or other factors which might cause the trap 10 to tip and contact the sea bottom 50 along an edge 54 of the trap 10, the weight distribution and overall shape of the trap 10 will cause the trap 10 to fall and settle in an upright position on the bottom 50.

According to still another aspect of the invention, the trap 10 may include a bridle 56 connected to the top frame portion 14 at one side of the trap 10. The bridle 56 may be in the form of a flexible rope or line having end portions 58, 60 attached to the top frame portion 14 at spaced-apart locations, such as at two adjacent corners 62, 64. The bridle 56 has a leading portion 66 intermediate of the end portions 58, 60 which is outwardly spaced from the trap 10. The leading portion 66 is attached to a retrieval line 68. This attachment of the bridle 56 to a trap 10 which is constructed according to the present invention will allow the trap 10 to be lifted through the water with an edge 57 directed upwardly as the trap 10 is retrieved. This allows a full trap 10 to be lifted through the water with the least possible resistance.

The overall shape of the trap 10 also allows it to be stacked for storage when the doors 28 are opened or removed. In the combination having an access means in the form of a flexible net material 27, the drawstring 31 may be loosened to allow the net 27 to drop into the trap 10 and the traps 10 may be easily stacked for storage.

The illustrated and above-described preferred embodiment of the invention is for the purpose of example only. Alterations and modifications may be made to the construction of the trap without departing from the spirit and scope of the invention. Therefore, the scope of my patent protection is not to be limited by the foregoing description, but rather only by the following claims, in accordance with doctrines of patent interpretation, including the doctrine of equivalents.

What is claimed is:

1. Crab trap, comprising:
   a frame composed of frame members and including a multi-sided bottom frame portion, a larger, equal-sided top frame portion spaced above the bottom frame portion, and generally diagonal frame members connecting the top frame portion to the bottom frame portion;
   a door opening adjacent at least one side of the bottom frame portion;
   barrier walls secured to the frame and defining an enclosure which is normally closed, said barrier walls including a bottom barrier wall and an inwardly opening flap door normally closing said door opening; and
   said flap door having a top connected to the trap and having a lower edge, said flap door normally being in a closed position with said lower edge contiguous the bottom barrier wall, and said flap door being resiliently bendable inwardly so that a crab seeking to enter the trap can lift the flap door and crawl into the trap below the flap door.

2. The crab trap of claim 1, having a door opening adjacent each side of the bottom frame portion.

3. The crab trap of claim 2, wherein said bottom and top frame portions are substantially square.

4. The crab trap of claim 1, wherein said flap door is composed of a thermoplastic mesh material.

5. The crab trap of claim 4, further comprising a strip of flaccid net material extending inwardly from said flap door's lower edge and being normally substantially contiguous with said bottom barrier wall.

6. The crab trap of claim 3, wherein said flap door is composed of a thermoplastic mesh material.

7. The crab trap of claim 6, further comprising a strip of flaccid net material extending inwardly from said flap door's lower edge and being normally substantially contiguous with said bottom barrier wall.

8. The crab trap of claim 1, wherein said barrier walls are made of a mesh material.

9. The crab trap of claim 8, wherein said mesh material is composed of a molded thermoplastic.

10. The crab trap of claim 8, wherein said mesh material is a flexible net.

11. A crab trap, comprising:
    a frame composed of frame members and including a multi-sided bottom frame portion, a larger, equal-sided top frame portion spaced above the bottom frame portion, and generally diagonal frame members connecting the top frame portion to the bottom frame portion;
    a door opening adjacent at least one side of the bottom frame portion;
    barrier walls secured to the frame and defining an enclosure which is normally closed, said barrier walls including a bottom barrier wall and an inwardly opening flap door normally closing said door opening; and
    said flap door having a top connected to the trap and having a lower edge, said flap door normally being in a closed position with said lower edge contiguous the bottom barrier wall, and said flap door being resiliently bendable inwardly so that a crab seeking to enter the trap can lift the flap door and crawl into the trap below the flap door,
    wherein said frame further includes an intermediate frame portion having a number of sides equal to that of the bottom and top frame portions, said intermediate frame portion being spaced between, and being intermediate in size between, said bottom and top frame portions, and said intermediate frame portion being connected to said bottom and top frame portions by said diagonal frame members.

12. The crab trap of claim 11, wherein said intermediate frame portion is sized to define said door opening between at least one side of said intermediate portion and said at least one side of the bottom frame portion.

13. The crab trap of claim 1, wherein said bottom and top frame portions are substantially square.

14. The crab trap of claim 13, wherein said generally diagonal frame members connect corresponding corners of said bottom and top frame portions.

15. A crab trap, comprising:
    a frame composed of frame members and including a multi-sided bottom frame portion, a larger, equal-sided top frame portion spaced above the bottom frame portion, and generally diagonal frame members connecting the top frame portion to the bottom frame portion;

a door opening adjacent at least one side of the bottom frame portion;

barrier walls secured to the frame and defining an enclosure which is normally closed, said barrier walls including a bottom barrier wall and an inwardly opening flap door normally closing said door opening; and said flap door having a top connected to the trap and having a lower edge, said flap door normally being in a closed position with said lower edge contiguous the bottom barrier wall, and said flap door being resiliently bendable inwardly so that a crab seeking to enter the trap can lift the flap door and crawl into the trap below the flap door, wherein said bottom and top frame portions are substantially square and said generally diagonal frame members connect corresponding corners of said bottom and top frame portions, and wherein said frame further includes a substantially square, intermediate-sized frame portion located between said bottom and top frame portions and connected to said generally diagonal frame members at its corners.

16. The crab trap of claim 1, further comprising an access means for allowing removal of trapped crabs.

17. The crab trap of claim 16, wherein said access means includes a top barrier wall made of flexible net which may be gathered generally centrally to provide closure and may be spread open to provide crab-removal access.

18. The crab trap of claim 16, wherein said access means includes a hinged door in a top barrier wall.

19. The crab trap of claim 18, wherein said door is composed of frame members having a mesh wall material secured thereon.

20. The crab trap of claim 1, further comprising a bridle having end portions connected to only one side of said top frame portion at spaced-apart locations, said bridle extending from the trap to a leading portion spaced from the trap such that when the trap is towed by said bridle, said trap will move substantially toward said one side.

21. A crab trap, comprising:
a multi-sided bottom;
a larger, equal-sided top;
sides which slope inwardly as they extend from the top down to the bottom;
at least one entry opening in at least one side of the trap adjacent one side of said bottom;
a bridle connected to the top of the trap at only one side of the trap, said bridle extending from the trap to a leading portion spaced from the trap; and
a retrieving line connected to the leading portion of the bridle such that when said line is towed said trap is lifted through the water with said one side directed substantially upwardly,
wherein the sides of the trap slope an amount sufficient to produce drag forces acting on the trap that will cause the trap to remain substantially upright during setting of the trap.

22. The crab trap of claim 21, having an entry opening in each of said sides.

23. The crab trap of claim 21, wherein said bottom and said top are substantially square.

24. The crab trap of claim 23, having an entry opening in each of the four sides.

25. The crab trap of claim 21, wherein said sides include upper and lower portions, said at least one entry opening being in at least one lower side portion.

26. A crab trap, comprising:
a multi-sided bottom;
a larger, equal-sided top;
sides which slope inwardly as they extend from the top down to the bottom;
at least one entry opening in at least one side of the trap adjacent one side of said bottom;
a bridle connected to the top of the trap at one side of the trap, said bridle extending from the trap to a leading portion spaced from the trap; and
a retrieving line connected to the leading portion of the bridle,
wherein the sides of the trap slope an amount sufficient to produce drag forces acting on the trap that will cause the trap to remain substantially upright during setting of the trap,
wherein said sides include upper and lower portions, said at least one entry opening being in at least one lower side portion, and
wherein said lower portion slopes inwardly to a greater extent than said upper portion.

27. The crab trap of claim 21, wherein said bridle includes end portions attached to the trap at spaced-apart locations along said one side.

28. A method of setting a crab trap, comprising:
providing a crab trap having a multi-sided bottom, a larger, equal-sided top, sides which slope inwardly from the top to the bottom, and at least one entrance opening in a side of the trap adjacent the bottom;
providing the trap with a bridle connected to an upper region of the trap at only a single side of the trap, and extending forwardly from the trap to a leading portion;
providing a towing line connected to the leading portion of the bridle;
placing the trap in the water, bottom end down, while holding the towing line;
moving relatively forward in the water away from the trap while paying out on the towing line at a rate allowing the trap to settle in the water and keeping said towing line taut; and
providing the sides of the trap with a slope that will produce drag forces causing the trap to assume a substantially upright position while settling in the water.

29. The crab trap of claim 1, wherein said lower edge of said flap door is contiguous the bottom barrier wall inwardly of said at least one side of the bottom frame portion such that said bottom barrier wall extends outwardly beyond said flap door's lower edge at a substantially uniform level.

* * * * *